US009245236B2

(12) United States Patent
Maes

(10) Patent No.: US 9,245,236 B2
(45) Date of Patent: Jan. 26, 2016

(54) FACTORIZATION OF CONCERNS TO BUILD A SDP (SERVICE DELIVERY PLATFORM)

(75) Inventor: Stephane H. Maes, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1378 days.

(21) Appl. No.: 11/357,653

(22) Filed: Feb. 16, 2006

(65) Prior Publication Data

US 2007/0204017 A1 Aug. 30, 2007

(51) Int. Cl.
G06F 15/16 (2006.01)
G06Q 10/00 (2012.01)

(52) U.S. Cl.
CPC ...................................... G06Q 10/00 (2013.01)

(58) Field of Classification Search
CPC ..... G06Q 10/00; H04L 29/06; H04L 29/0602
USPC .................................. 709/203, 227, 230, 250
See application file for complete search history.

(56) References Cited

U.S. PATENT DOCUMENTS

| 5,414,812 | A | * | 5/1995 | Filip et al. ...................... 707/694 |
| 5,613,060 | A | | 3/1997 | Britton et al. |
| 5,699,513 | A | | 12/1997 | Feigen et al. |
| 5,737,321 | A | | 4/1998 | Takahashi |
| 5,786,770 | A | * | 7/1998 | Thompson ................ 340/825.02 |
| 5,850,517 | A | | 12/1998 | Verkler et al. |
| 5,867,665 | A | | 2/1999 | Butman et al. |
| 5,946,634 | A | | 8/1999 | Korpela |
| 6,115,690 | A | | 9/2000 | Wong |
| 6,119,104 | A | | 9/2000 | Brumbelow |
| 6,128,645 | A | | 10/2000 | Butman et al. |
| 6,157,941 | A | | 12/2000 | Verkler et al. |
| 6,163,800 | A | | 12/2000 | Ejiri |
| 6,192,231 | B1 | | 2/2001 | Chapman et al. |
| 6,192,414 | B1 | | 2/2001 | Horn |
| 6,230,271 | B1 | | 5/2001 | Wadlow et al. |
| 6,272,556 | B1 | | 8/2001 | Gish |

(Continued)

FOREIGN PATENT DOCUMENTS

| WO | WO 2007134468 A1 | 11/2007 |
| WO | 2008111027 | 12/2008 |
| WO | 2008146097 | 12/2008 |

OTHER PUBLICATIONS

Wikipedia, "Parlay", <http://web.archive.org/web/20050130172632/en.wikipedia.org/wiki/Parlay>, Jan. 30, 2005.*

(Continued)

Primary Examiner — Waseem Ashraf
(74) Attorney, Agent, or Firm — Kilpatrick Townsend & Stockton LLP

(57) ABSTRACT

A service layer is provided that is concerned with providing a service. Also, a network layer is provided that is concerned with communicating with devices. The concerns of each layer are separate. For example, the service layer performs the service without worrying about any network dependencies. Also, the network layer is concerned with communicating with devices without worrying about the services that are being performed. These layers, however, are configured to work together such that a result of the service layer is used by the network layer. For example, a service may be performed by the service layer and then the result of the service is communicated to a device using the network layer.

14 Claims, 10 Drawing Sheets

(56) References Cited

U.S. PATENT DOCUMENTS

| | | | |
|---|---|---|---|
| 6,275,857 B1 | 8/2001 | McCartney | |
| 6,336,138 B1 | 1/2002 | Caswell et al. | |
| 6,374,305 B1 | 4/2002 | Gupta et al. | |
| 6,466,984 B1 | 10/2002 | Naveh et al. | |
| 6,496,864 B1 | 12/2002 | McCartney | |
| 6,553,108 B1* | 4/2003 | Felger | 379/144.01 |
| 6,578,159 B1 | 6/2003 | Kitagawa et al. | |
| 6,611,812 B2 | 8/2003 | Hurtado et al. | |
| 6,611,867 B1* | 8/2003 | Bowman-Amuah | H04L 12/2602 709/218 |
| 6,633,560 B1 | 10/2003 | Tiwari et al. | |
| 6,748,570 B1 | 6/2004 | Bahrs et al. | |
| 6,792,605 B1 | 9/2004 | Roberts et al. | |
| 6,813,278 B1* | 11/2004 | Swartz et al. | 370/466 |
| 6,868,413 B1 | 3/2005 | Grindrod et al. | |
| 6,965,902 B1 | 11/2005 | Ghatate | |
| 6,978,348 B2 | 12/2005 | Belknap et al. | |
| 6,981,023 B1 | 12/2005 | Hamilton et al. | |
| 6,985,939 B2 | 1/2006 | Fletcher et al. | |
| 6,990,491 B2 | 1/2006 | Dutta et al. | |
| 7,003,578 B2 | 2/2006 | Kanada et al. | |
| 7,042,988 B2 | 5/2006 | Juitt et al. | |
| 7,043,538 B2 | 5/2006 | Guedalia et al. | |
| 7,051,092 B2 | 5/2006 | Lenz et al. | |
| 7,072,653 B1 | 7/2006 | Sladek et al. | |
| 7,073,055 B1* | 7/2006 | Freed et al. | 713/155 |
| 7,089,317 B2 | 8/2006 | Jeyaraman et al. | |
| 7,092,385 B2 | 8/2006 | Gallant et al. | |
| 7,106,848 B1 | 9/2006 | Barlow et al. | |
| 7,111,060 B2 | 9/2006 | Araujo et al. | |
| 7,114,146 B2 | 9/2006 | Zhang et al. | |
| 7,114,148 B2 | 9/2006 | Irving et al. | |
| 7,133,669 B2 | 11/2006 | Nair et al. | |
| 7,143,094 B2 | 11/2006 | Arroyo et al. | |
| 7,146,616 B2 | 12/2006 | Dorner et al. | |
| 7,185,333 B1 | 2/2007 | Shafron | |
| 7,185,342 B1 | 2/2007 | Carrer et al. | |
| 7,194,482 B2 | 3/2007 | Larkin et al. | |
| 7,222,148 B2 | 5/2007 | Potter et al. | |
| 7,222,334 B2 | 5/2007 | Casati et al. | |
| 7,266,600 B2 | 9/2007 | Fletcher et al. | |
| 7,269,162 B1 | 9/2007 | Turner | |
| 7,269,431 B1 | 9/2007 | Gilbert | |
| 7,272,625 B1 | 9/2007 | Hannel et al. | |
| 7,281,029 B2 | 10/2007 | Rawat | |
| 7,295,532 B2 | 11/2007 | Haller et al. | |
| 7,302,570 B2* | 11/2007 | Beard et al. | 713/171 |
| 7,340,508 B1 | 3/2008 | Kasi et al. | |
| 7,409,707 B2 | 8/2008 | Swander et al. | |
| 7,411,943 B2 | 8/2008 | Kittredge et al. | |
| 7,415,010 B1 | 8/2008 | Croak et al. | |
| 7,426,381 B2 | 9/2008 | Maes | |
| 7,433,838 B2 | 10/2008 | Welsh et al. | |
| 7,443,972 B1 | 10/2008 | Barlow et al. | |
| 7,444,620 B2 | 10/2008 | Marvin | |
| 7,447,793 B2 | 11/2008 | Morioka | |
| 7,448,022 B1 | 11/2008 | Ram et al. | |
| 7,454,399 B2 | 11/2008 | Matichuk | |
| 7,461,062 B2 | 12/2008 | Stewart et al. | |
| 7,467,384 B2 | 12/2008 | Brubacher et al. | |
| 7,472,349 B1 | 12/2008 | Srivastava et al. | |
| 7,478,416 B2 | 1/2009 | Edson | |
| 7,519,076 B2 | 4/2009 | Janssen et al. | |
| 7,580,994 B1 | 8/2009 | Fiszman et al. | |
| 7,590,696 B1 | 9/2009 | Odell et al. | |
| 7,617,521 B2 | 11/2009 | Maes | |
| 7,630,953 B2* | 12/2009 | Stauber et al. | |
| 7,644,145 B2 | 1/2010 | Rockwell | |
| 7,660,297 B2 | 2/2010 | Fisher et al. | |
| 7,676,813 B2 | 3/2010 | Bisset et al. | |
| 7,702,792 B2 | 4/2010 | Shaffer et al. | |
| 7,716,310 B2 | 5/2010 | Foti | |
| 7,720,926 B2 | 5/2010 | Asahara | |
| 7,730,129 B2 | 6/2010 | Wang et al. | |
| 7,752,634 B1 | 7/2010 | Saxena et al. | |
| 7,779,445 B2 | 8/2010 | Ellis | |
| 7,853,647 B2 | 12/2010 | Maes | |
| 7,860,490 B2 | 12/2010 | Maes | |
| 7,865,607 B2 | 1/2011 | Sonalkar et al. | |
| 7,873,716 B2 | 1/2011 | Maes | |
| 7,904,909 B1 | 3/2011 | Reiner et al. | |
| 7,925,727 B2 | 4/2011 | Sullivan et al. | |
| 7,933,397 B2 | 4/2011 | Jain | |
| 8,023,971 B2 | 9/2011 | Egli | |
| 8,027,921 B1 | 9/2011 | Boydstun et al. | |
| 8,032,920 B2 | 10/2011 | Maes | |
| 8,036,362 B1 | 10/2011 | Skinner | |
| 8,060,067 B2 | 11/2011 | Tarleton et al. | |
| 8,068,860 B1 | 11/2011 | Midkiff | |
| 8,073,810 B2 | 12/2011 | Maes | |
| 8,086,665 B1 | 12/2011 | Soukup et al. | |
| 8,090,848 B2 | 1/2012 | Maes | |
| 8,114,555 B2 | 2/2012 | Leonida et al. | |
| 8,121,278 B2 | 2/2012 | Leigh et al. | |
| 8,161,171 B2 | 4/2012 | Maes | |
| 8,214,503 B2 | 7/2012 | Maes | |
| 8,223,951 B1 | 7/2012 | Edelhaus et al. | |
| 8,230,449 B2 | 7/2012 | Maes | |
| 8,255,470 B2 | 8/2012 | Jackson et al. | |
| 8,321,498 B2 | 11/2012 | Maes | |
| 8,321,594 B2 | 11/2012 | Maes et al. | |
| 8,335,862 B2 | 12/2012 | Fletcher et al. | |
| 8,370,506 B2 | 2/2013 | Maes | |
| 8,401,022 B2 | 3/2013 | Maes et al. | |
| 8,458,703 B2 | 6/2013 | Maes | |
| 8,478,311 B2 | 7/2013 | Sennett et al. | |
| 8,505,067 B2 | 8/2013 | Maes | |
| 8,533,773 B2 | 9/2013 | Maes | |
| 8,539,097 B2 | 9/2013 | Maes | |
| 8,543,665 B2 | 9/2013 | Ansari et al. | |
| 8,589,338 B2 | 11/2013 | Maes | |
| 8,675,852 B2 | 3/2014 | Maes | |
| 8,676,155 B2 | 3/2014 | Fan et al. | |
| 8,849,685 B2* | 9/2014 | Oden | G06Q 10/063 705/7.11 |
| 8,879,547 B2 | 11/2014 | Maes | |
| 8,914,493 B2 | 12/2014 | Maes et al. | |
| 8,918,493 B1* | 12/2014 | Beach | G06F 9/5061 709/223 |
| 8,966,498 B2 | 2/2015 | Maes | |
| 9,038,082 B2 | 5/2015 | Maes | |
| 9,083,599 B2* | 7/2015 | Huuhtanen | G06F 9/465 |
| 9,088,570 B2* | 7/2015 | Anderson | H04L 67/10 |
| 2001/0010053 A1 | 7/2001 | Ben-Shachar et al. | |
| 2001/0016880 A1 | 8/2001 | Cai et al. | |
| 2001/0028649 A1 | 10/2001 | Pogossiants et al. | |
| 2002/0002684 A1 | 1/2002 | Fox et al. | |
| 2002/0004827 A1* | 1/2002 | Ciscon | H04L 12/5695 709/223 |
| 2002/0075844 A1 | 6/2002 | Hagen | |
| 2002/0087674 A1 | 7/2002 | Guilford et al. | |
| 2002/0099738 A1* | 7/2002 | Grant | 707/513 |
| 2002/0101879 A1 | 8/2002 | Bouret | |
| 2002/0104015 A1 | 8/2002 | Barzilai et al. | |
| 2002/0111848 A1 | 8/2002 | White | |
| 2002/0120729 A1 | 8/2002 | Faccin et al. | |
| 2002/0143819 A1 | 10/2002 | Han et al. | |
| 2002/0144119 A1* | 10/2002 | Benantar | 713/171 |
| 2002/0178122 A1 | 11/2002 | Maes | |
| 2002/0184373 A1 | 12/2002 | Maes | |
| 2002/0191774 A1* | 12/2002 | Creamer | H04Q 3/0029 379/230 |
| 2002/0194388 A1 | 12/2002 | Boloker et al. | |
| 2002/0198719 A1 | 12/2002 | Gergic et al. | |
| 2002/0198991 A1 | 12/2002 | Gopalakrishnan et al. | |
| 2003/0003953 A1 | 1/2003 | Houplain | |
| 2003/0004746 A1* | 1/2003 | Kheirolomoom et al. | 705/1 |
| 2003/0005034 A1 | 1/2003 | Amin | |
| 2003/0023953 A1 | 1/2003 | Lucassen et al. | |
| 2003/0046316 A1 | 3/2003 | Gergic et al. | |
| 2003/0061268 A1 | 3/2003 | Moerdijk et al. | |
| 2003/0061404 A1 | 3/2003 | Atwal et al. | |
| 2003/0115203 A1 | 6/2003 | Brown et al. | |

(56) References Cited

U.S. PATENT DOCUMENTS

| | | |
|---|---|---|
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0182550 A1* | 9/2003 | Chen ............... G06F 9/548 713/167 |
| 2003/0185233 A1 | 10/2003 | Ji et al. |
| 2003/0191769 A1 | 10/2003 | Crisan et al. |
| 2003/0191823 A1 | 10/2003 | Bansal et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1* | 1/2004 | Karakashian et al. ........ 709/223 |
| 2004/0019695 A1 | 1/2004 | Fellenstein et al. |
| 2004/0024720 A1 | 2/2004 | Fairweather |
| 2004/0044647 A1 | 3/2004 | Salmenkaita |
| 2004/0054718 A1* | 3/2004 | Hicks, III .......... H04L 69/329 709/203 |
| 2004/0064528 A1 | 4/2004 | Meredith et al. |
| 2004/0068586 A1 | 4/2004 | Xie et al. |
| 2004/0093381 A1 | 5/2004 | Hodges et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1* | 7/2004 | Arellano ............. H04L 29/06 709/201 |
| 2004/0153545 A1 | 8/2004 | Pandaya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0004974 A1 | 1/2005 | Sharma et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1* | 6/2005 | Li et al. .................. 715/513 |
| 2005/0172027 A1* | 8/2005 | Castellanos et al. ........ 709/229 |
| 2005/0193269 A1 | 9/2005 | Haswell et al. |
| 2005/0204391 A1* | 9/2005 | Hunleth ............. H04N 7/163 725/78 |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1* | 12/2005 | Bailey ..................... 709/230 |
| 2006/0014688 A1 | 1/2006 | Costa et al. |
| 2006/0021010 A1 | 1/2006 | Atkins et al. |
| 2006/0031441 A1 | 2/2006 | Davis et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0047753 A1 | 3/2006 | Pal |
| 2006/0048159 A1 | 3/2006 | Yazawa et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1* | 5/2006 | Adamczyk ............. H04L 67/24 370/466 |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0117376 A1 | 6/2006 | Maes |
| 2006/0136560 A1 | 6/2006 | Jiang |
| 2006/0143622 A1 | 6/2006 | Prabandham et al. |
| 2006/0143686 A1 | 6/2006 | Maes |
| 2006/0146792 A1 | 7/2006 | Ramachandran et al. |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1* | 1/2007 | Kramer et al. ................ 709/226 |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1 | 3/2007 | Shtivelman et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0150480 A1 | 6/2007 | Hwang et al. |
| 2007/0150936 A1 | 6/2007 | Maes |
| 2007/0173226 A1 | 7/2007 | Cai et al. |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0198982 A1 | 8/2007 | Bolan et al. |
| 2007/0201376 A1 | 8/2007 | Marshall-Wilson |
| 2007/0203841 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1 | 11/2007 | Tumminaro |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |
| 2008/0080479 A1 | 4/2008 | Maes |
| 2008/0085712 A1 | 4/2008 | Han |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0163235 A1 | 7/2008 | Marvin et al. |
| 2008/0168523 A1 | 7/2008 | Ansari et al. |
| 2008/0171549 A1 | 7/2008 | Hursey et al. |
| 2008/0172482 A1 | 7/2008 | Shah |

(56) References Cited

U.S. PATENT DOCUMENTS

| | | |
|---|---|---|
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0201715 A1 | 8/2008 | Breiter et al. |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0271039 A1 | 10/2008 | Rolia et al. |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0292074 A1 | 11/2008 | Boni et al. |
| 2008/0293389 A1 | 11/2008 | Chin et al. |
| 2008/0301135 A1 | 12/2008 | Alves et al. |
| 2008/0307108 A1 | 12/2008 | Yan et al. |
| 2008/0313648 A1 | 12/2008 | Wang et al. |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1 | 1/2009 | Brunson et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0119672 A1 | 5/2009 | Bussard et al. |
| 2009/0125595 A1 | 5/2009 | Maes |
| 2009/0132220 A1 | 5/2009 | Chakraborty et al. |
| 2009/0132717 A1 | 5/2009 | Maes |
| 2009/0154681 A1 | 6/2009 | Kung et al. |
| 2009/0180440 A1 | 7/2009 | Sengupta et al. |
| 2009/0185576 A1 | 7/2009 | Kisel et al. |
| 2009/0187919 A1 | 7/2009 | Maes |
| 2009/0190603 A1 | 7/2009 | Damola et al. |
| 2009/0192992 A1 | 7/2009 | Arthursson |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222836 A1 | 9/2009 | Paval |
| 2009/0222858 A1 | 9/2009 | Hjelm et al. |
| 2009/0228584 A1 | 9/2009 | Maes et al. |
| 2009/0253434 A1 | 10/2009 | Hayashi et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0185772 A1 | 7/2010 | Wang et al. |
| 2010/0192004 A1 | 7/2010 | Bauchot et al. |
| 2010/0235844 A1 | 9/2010 | Arwe et al. |
| 2010/0281488 A1 | 11/2010 | Krishnamurthy et al. |
| 2011/0035443 A1 | 2/2011 | Jensen |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0134843 A1 | 6/2011 | Noldus et al. |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2011/0280383 A1 | 11/2011 | Varga et al. |
| 2012/0045040 A1 | 2/2012 | Maes |
| 2012/0047506 A1 | 2/2012 | Maes |
| 2012/0106728 A1 | 5/2012 | Ghaffari et al. |
| 2012/0173745 A1 | 7/2012 | Maes |

OTHER PUBLICATIONS

The Parlay Group, "Specifications", <http://web.archive.org/web/20050114014707/www.parlay.org/specs/index.asp>, Jan. 14, 2005.*

Wikipedia, "Object-Oriented Programming", <http://web.archive.org/web/20051211141918/http://en.wikipedia.org/wiki/Object-oriented_programming>, Dec. 11, 2005.*

Wikipedia, "OSI model", <http://web.archive.org/web/20050907132012/http://en.wikipedia.org/wiki/Osi_model>, Sep. 7, 2005.*

O'Doherty, Phelim, "JSLEE—SIP Servlet", <http://java.sun.com/products/jain/JSLEE-SIPServlet.pdf>, 2003.*

Maretzke, Michael, "JAIN SLEE Technology Overview", <http://www.maretzke.de/pub/lectures/jslee_overview_2005/JSLEE_Overview_2005.pdf>, Apr. 12, 2005.*

Burger, E. et al., "Deploying CCXML for Application-Layer Call Control," Aug. 2006, 11 pages.

Kim et al., "Implementation of Third Party Based Call Control using Parlay Network API in SIP Environment," ICOIN 2003, LNCS 2662, 2003, pp. 416-425.

Romellini, C. et al., "CCXML: The Power of Standardization," Loquendo, Sep. 27, 2005.

U.S. Appl. No. 11/848,347, filed Aug. 31, 2007, Office Action mailed Sep. 30, 2010, 19 pages.

U.S. Appl. No. 11/877,129, filed Oct. 23, 2007, Notice of Allowance mailed Aug. 5, 2010, 6 pages.

U.S. Appl. No. 11/943,101, filed Nov. 20, 2007, Office Action mailed Aug. 27, 2010, 11 pages.

U.S. Appl. No. 11/951,500, filed Dec. 6, 2007, Office Action mailed Sep. 1, 2010, 30 pages.

U.S. Appl. No. 12/019,299, filed Jan. 24, 2008, Final Office Action mailed Oct. 6, 2010, 20 pages.

U.S. Appl. No. 10/856,588, filed May 28, 2004, Advisory Action dated Jan. 5, 2010, 3 pages.

U.S. Appl. No. 10/856,588, filed May 28, 2004, Final Office Action dated Oct. 15, 2008, 11 pages.

U.S. Appl. No. 10/856,588, filed May 28, 2004, Final Office Action dated Oct. 20, 2009, 17 pages.

U.S. Appl. No. 10/856,588, filed May 28, 2004, Notice of Allowance dated Sep. 23, 2010, 8 pages.

U.S. Appl. No. 10/856,588, filed May 28, 2004, Office Action dated Mar. 16, 2009, 10 pages.

U.S. Appl. No. 10/856,588, filed May 28, 2004, Office Action dated Apr. 11, 2008, 16 pages.

U.S. Appl. No. 11/024,160, filed Dec. 27, 2004, Advisory Action dated Feb. 18, 2010, 3 pages.

U.S. Appl. No. 11/024,160, filed Dec. 27, 2004, Final Office Action dated Oct. 15, 2010, 11 pages.

U.S. Appl. No. 11/024,160, filed Dec. 27, 2004, Final Office Action dated Dec. 3, 2009, 11 pages.

U.S. Appl. No. 11/024,160, filed Dec. 27, 2004, Final Office Action dated Feb. 11, 2009, 9 pages.

U.S. Appl. No. 11/024,160, filed Dec. 27, 2004, Office Action dated Jun. 29, 2009, 9 pages.

U.S. Appl. No. 11/024,160, filed Dec. 27, 2004, Office Action dated Jun. 9, 2010, 10 pages.

U.S. Appl. No. 11/024,160, filed Dec. 27, 2004, Office Action dated Aug. 22, 2008, 8 pages.

U.S. Appl. No. 11/070,317, filed Mar. 1, 2005, Final Office Action dated Sep. 27, 2010, 8 pages.

U.S. Appl. No. 11/123,468, filed May 5, 2005, Advisory Action dated Feb. 17, 2010, 3 pages.

(56) References Cited

OTHER PUBLICATIONS

U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Final Office Action mailed May 10, 2010, 15 pages.
U.S. Appl. No. 11/877,129, filed Oct. 23, 2007, Advisory Action mailed Jun. 3, 2010, 2 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.
U.S. Appl. No. 10/855,999, filed May 28, 2004, Office Action dated Jun. 24, 2010, 20 pages.
U.S. Appl. No. 12/045,220, filed Mar. 10, 2008, Advisory Action dated Jun. 11, 2010, 3 pages.
U.S. Appl. No. 11/024,160, filed Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Web IBM Position W3C/WAP Workshop, IBM Research Human Language Technologies, downloaded http://www.w3.org on May 26, 2003, 9 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 pages.
Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/848,347, filed Aug. 31, 2007, Office Action mailed Oct. 29, 2009, 12 pages.
U.S. Appl. No. 11/877,129, filed Oct. 23, 2007, Final Office Action mailed Mar. 29, 2010, 17 pages.
U.S. Appl. No. 11/877,129, filed Oct. 23, 2007, Office Action mailed Sep. 28, 2009, 15 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 9 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 12/019,299, filed Jan. 24, 2008, Office Action mailed Mar. 31, 2010, 13 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.
U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action mailed Mar. 17, 2011, 21 pages.

(56) References Cited

OTHER PUBLICATIONS

International Search Report and Written Opinion of PCT/US2010/037074 mailed Jun. 1, 2011, 16 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Final Office Action mailed Apr. 14, 2011, 33 pages.
U.S. Appl. No. 11/024,160, filed Dec. 27, 2004, Final Office Action dated Jun. 1, 2011, 11 pages.
U.S. Appl. No. 12/019,335, filed Jan. 24, 2008, Office Action mailed May 23, 2011, 18 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/943,101, filed Nov. 20, 2007, Notice of Allowance mailed Dec. 9, 2011, 7 pages.
U.S. Appl. No. 12/019,335, filed Jan. 24, 2008, Final Office Action mailed Dec. 5, 2011, 19 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Advisory Action mailed Jan. 5, 2012, 3 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
U.S. Appl. No. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Office Action dated Oct. 18, 2011, 21 pages.
U.S. Appl. No. 12/544,459, filed Aug. 20, 2009, Notice of Allowance mailed Aug. 22, 2011, 8 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Final Office Action mailed Oct. 21, 2011, 11 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 12/490,540, filed Jun. 24, 2009, Notice of Allowance dated Feb. 4, 2013, 43 pages.
U.S. Appl. No. 12/948,247, filed Nov. 17, 2010, Final Office Action mailed Feb. 11, 2013, 25 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
3rd Generation Partnership Project 2, "Presence Service: Architecture and Functional Description", doc. No. 3GPP2 X.S0027-001-0, published on Sep. 2004.
Day et al., "RFC 2778, A Model for Presence and Instant Messaging", published on Feb. 2000, 12 pages.

(56) References Cited

OTHER PUBLICATIONS

U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 11/070,317, filed Mar. 1, 2005, Notice of Allowance dated Oct. 19, 2012, 2 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Advisory Action dated Sep. 14, 2012, 3 pages.
U.S. Appl. No. 12/364,642, filed Feb. 3, 2009, Notice of Allowance dated Nov. 14, 2012, 8 pages.
U.S. Appl. No. 12/544,471, filed Aug. 20, 2009, Final Office Action dated Jul. 30, 2012, 26 pages.
U.S. Appl. No. 12/544,471, filed Aug. 20, 2009, Advisory Action dated Nov. 9, 2012, 3 pages.
U.S. Appl. No. 12/019,299, filed Jan. 24, 2008, Final Office Action mailed Aug. 15, 2012, 19 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Office Action mailed Dec. 7, 2012, 21 pages.
U.S. Appl. No. 12/791,129, filed Jun. 1, 2010, Final Office Action mailed Dec. 7, 2012, 9 pages.
U.S. Appl. No. 13/416,413, filed Mar. 9, 2012, Notice of Allowance mailed Oct. 2, 2012, 5 pages.
U.S. Appl. No. 12/948,450, filed Nov. 17, 2010, Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. 12/957,740, filed Dec. 1, 2010, Non-final Office Action mailed Oct. 17, 2012, 52 pages.
U.S. Appl. No. 12/045,220, filed Mar. 10, 2008, Non-Final Office Action dated Oct. 7, 2013, 19 pages.
U.S. Appl. No. 12/014,387, filed Jan. 15, 2008, Notice of Allowance mailed Oct. 25, 2013, 17 pages.
U.S. Appl. No. 12/018,718, filed Jan. 23, 2008, Final Office Action mailed Sep. 10, 2013, 55 pages.
U.S. Appl. No. 12/791,129, filed Jun. 1, 2010, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/957,740, filed Dec. 1, 2010, Non-final Office Action mailed Aug. 15, 2013, 17 pages.
U.S. Appl. No. 13/029,219, filed Feb. 17, 2011, Final Office Action mailed Oct. 11, 2013, 22 pages.
U.S. Appl. No. 12/957,697, filed Dec. 1, 2010 Non-Final Office Action mailed Oct. 1, 2013, 10 pages.
U.S. Appl. No. 10/855,999, filed May 28, 2004, Final Office Action dated Nov. 18, 2013, 14 pages.
U.S. Appl. No. 12/019,335, filed Jan. 24, 2008, Final Office Action mailed Jan. 14, 2014, 33 pages.
U.S. Appl. No. 11/969,343, filed Jan. 4, 2008, Notice of Allowance mailed Jan. 16, 2014, 6 pages.
U.S. Appl. No. 12/018,718, filed Jan. 23, 2008, Advisory Action mailed Nov. 15, 2013, 3 pages.
U.S. Appl. No. 12/791,129, filed Jun. 1, 2010, Final Office Action mailed Dec. 20, 2013, 10 pages.
U.S. Appl. No. 12/949,287, filed Nov. 18, 2010, Final Office Action mailed Nov. 25, 2013, 25 pages.
U.S. Appl. No. 13/029,219, filed Feb. 17, 2011, Advisory Action mailed Jan. 2, 2014, 3 pages.
U.S. Appl. No. 12/949,183, filed Nov. 18, 2010, Final Office Action mailed Jan. 21, 2014, 19 pages.
U.S. Appl. No. 13/029,226, filed Feb. 17, 2011, Final Office Action mailed Jan. 30, 2014, 17 pages.
U.S. Appl. No. 10/855,999, Non-Final Office Action mailed on Jun. 17, 2015, 16 pages.
U.S. Appl. No. 12/018,718, Final Office Action mailed on Jun. 30, 2015, 22 pages.
U.S. Appl. No. 12/957,697, Final Office Action mailed on Jun. 18, 2015, 12 pages.
U.S. Appl. No. 13/029,226, Non-Final Office Action mailed on Jun. 19, 2015, 13 pages.
U.S. Appl. No. 12/018,718, Non-Final Office Action mailed on Sep. 30, 2014, 50 pages.
U.S. Appl. No. 12/045,220, Notice of Allowance mailed on Aug. 13, 2014, 5 pages.
U.S. Appl. No. 12/544,484, Non-Final Office Action mailed on Aug. 1, 2014, 14 pages.
U.S. Appl. No. 12/791,129, Corrected Notice of Allowability mailed on Oct. 6, 2014, 6 pages.
U.S. Appl. No. 12/949,183, Non-Final Office Action mailed on Sep. 22, 2014, 16 pages.
U.S. Appl. No. 12/949,287, Non-Final Office Action mailed on Sep. 8, 2014, 27 pages.
U.S. Appl. No. 13/029,219, Final Office Action mailed on Sep. 12, 2014, 24 pages.
U.S. Appl. No. 12/948,247, Final Office Action mailed on Nov. 25, 2014, 20 pages.
U.S. Appl. No. 12/957,697, Final Office Action mailed on Nov. 26, 2014, 11 pages.
U.S. Appl. No. 11/123,468, Non-Final Office Action mailed on Jan. 30, 2015, 19 pages.
U.S. Appl. No. 12/544,484, Final Office Action mailed on Dec. 26, 2014, 12 pages.
U.S. Appl. No. 12/949,183, Final Office Action mailed on Jan. 22, 2015, 16 pages.
U.S. Appl. No. 12/949,287, Final Office Action mailed on Dec. 23, 2014, 27 pages.
U.S. Appl. No. 12/957,697, Advisory Action mailed on Feb. 3, 2015, 3 pages.
U.S. Appl. No. 13/029,219, Notice of Allowance mailed on Jan. 22, 2015, 12 pages.
U.S. Appl. No. 13/029,226, Final Office Action mailed on Jan. 8, 2015, 13 pages.
U.S. Appl. No. 12/957,697, Non-Final Office Action mailed on Jul. 2, 2014, 9 pages.
U.S. Appl. No. 12/544,484, Advisory Action mailed on Mar. 10, 2015, 3 pages.
U.S. Appl. No. 12/948,247, Advisory Action mailed on Mar. 6, 2015, 3 pages.
U.S. Appl. No. 12/949,183, Advisory Action mailed on Mar. 26, 2015, 3 pages.
U.S. Appl. No. 12/949,287, Advisory Action mailed on Mar. 10, 2015, 3 pages.
U.S. Appl. No. 12/957,697, Non-Final Office Action mailed on Mar. 6, 2015, 11 pages.
U.S. Appl No. 12/957,740, Non-Final Office Action mailed on Feb. 13, 2015, 17 pages.
U.S. Appl. No. 13/029,226, Advisory Action mailed on Mar. 25, 2015, 2 pages.
U.S. Appl. No. 11/969,343, Notice of Allowance mailed on Apr. 9, 2014, 6 pages.
U.S. Appl. No. 12/014,387, Corrective Notice of Allowance mailed on Dec. 18, 2013, 4 pages.
U.S. Appl. No. 12/019,299, Notice of Allowance mailed on Jul. 3, 2013, 6 pages.
U.S. Appl. No. 12/019,335, Non Final Office Action mailed on Jul. 26, 2013, 19 pages.
U.S. Appl. No. 12/045,220, Final Office Action mailed on Apr. 18, 2014, 20 pages.
U.S. Appl. No. 12/544,471, Notice of Allowance mailed on Mar. 12, 2013, 19 pages.

(56) References Cited

OTHER PUBLICATIONS

U.S. Appl. No. 12/544,484, Non Final Office Action mailed on May 8, 2014, 13 pages.
U.S. Appl. No. 12/791,129, Advisory Action mailed on Mar. 6, 2014, 3 pages.
U.S. Appl. No. 12/791,129, Notice of Allowance mailed on Apr. 24, 2014, 9 pages.
U.S. Appl. No. 12/949,183, Advisory Action mailed on Apr. 10, 2014, 3 pages.
U.S. Appl. No. 12/957,697, Non-Final Office Action mailed on Mar. 20, 2014, 12 pages.
U.S. Appl. No. 12/957,740, Final Office Action mailed on Feb. 19, 2014, 18 pages.
U.S. Appl. No. 13/029,219, Non Final Office Action mailed on Apr. 11, 2014, 23 pages.
U.S. Appl. No. 13/029,226, Advisory Action mailed on Apr. 7, 2014, 3 pages.
Maffioletti et al., Automatic resource and service management for ubiquitous computing environments, Pervasive Computing and Communications Workshops, Proceedings of the Second IEEE Annual Conference on IEEE, 2004.
Simon et al., A simple query interface for interoperable teaming repositories, Proceedings of the 1st Workshop on Interoperability of Web-based Educational Systems, 2005, pp. 11-18.

\* cited by examiner

FACTORIZATION OF CONCERNS TO BUILD A SDP (SERVICE DELIVERY PLATFORM)

BACKGROUND OF THE INVENTION

Embodiments of the present invention generally relate to a service delivery platform and more specifically to a service delivery platform that is separated into a plurality of layers that perform different functions where concerns of one layer are factored out of another layer.

Many different services can be delivered to users. A service delivery platform is typically used to deliver the services to devices used by users that are based on network/service provider resources (e.g. location presence) used in services provided by the service provider or by a third party that uses these features to extend the features of their applications. Different devices can be contacted through various networks and the networks may communicate through different protocols and channels. For example, a wireless network may communicate through protocols such as code division multiple access (CDMA), and general packet radio services (GPRS), wireless fidelity (WiFi), etc. Additionally, different channels may be used to communicate with wireless devices, such as short message service (SMS), multimedia service (MMS), email, instant messaging, etc. Further, in addition to wireless networks, other networks may be used, such as the Internet or other wireline networks, to provide services through different protocols and channels, such as through instant messaging, email, etc. As one can see, there are many different communication options in which to deliver services to users.

A service is typically tailored to deliver results through each different network protocol and channel, or through multiple networks and channels. For example, a service may be offered that provides a location of a device (a global positioning service (GPS)). This service may be provided for many different network protocols and channels. For example, a location service may provide a location for a device communicating through different wireless protocols. Further, the location may be sent to a user using the different channels stated above. In one example, a location may be sent using SMS through a CDMA network to a cellular phone. However, the service provider does not want to be limited to providing services to just this network through this channel. Rather, a service provider would like to provide the service to many different networks and channels, such as through IM, MMS, email, etc. Accordingly, the service is built out such that it can be provided through the many different network protocols and channels.

Each of the different network protocols and channels include different network dependencies that need to be built into the service. For example, the service needs to know how to send an SMS message and an email to a cellular phone, where SMS and email have different requirements. Building the different network requirements, features, capabilities, and interfaces into the service causes the service to become complicated. Also, different network equipment, different technologies, and different resources cause a service provider to adapt the service to different vendors, technologies etc. By entangling all these dependencies with the services, services are either vertically developed for a particular network and technology or are very complicated to develop to cover multiple networks and technologies. In the former case, the services need to be changed when anything changes (e.g., network resources change). In the latter case, the service needs to be changed when a new technology, network, or network resource is introduced that was not considered when the network was developed.

Further, in addition to providing the core service, such as providing a location of a device, the service may provide business services using business rules. For example, a user's account should be charged, privacy rules may need to be adhered to, etc. These business rules need to be built into the core service, which further complicates providing the service. By having the service entangled with the associated business rules, when one of the business rules changes, the service has to be changed. Thus, a service that is directed at providing a location becomes very complicated when the dependencies of the business rules and the network are added into the service.

BRIEF SUMMARY OF THE INVENTION

Embodiments of the present invention generally relate to a service delivery platform that includes a plurality of layers, where each layer is directed towards a separate concern that can be performed independent of a concern of another layer.

In one embodiment, a service delivery platform (SDP) configured to provide services is provided. The platform comprises: a network layer configured to perform a first function concerned with communicating with a network; a service layer configured to perform a second function concerned with a service; a business rules layer configured to perform a third function concerned with applying business rules; wherein the first function of the network layer is factored out of the second function of the service layer, wherein the second function of the service layer is factored out of the third function of the business rules layer, wherein the second function performs a service in the service layer, wherein the service is designed without being concerned with communicating with the network using the first function of the network layer, wherein business rules for the third function are performed for the service without being concerned with how the service is performed.

In another embodiment, a service delivery platform configured to provide services in a telecommunications network is provided. The platform comprises: a business rules layer comprising a plurality of business rules to apply to a service; a service layer comprising a plurality of service modules, each service module configured to perform a service, the service being offered to a user; and a network layer comprising a plurality of network implementations, each network implementation configured to communicate with a device using a different protocol, the device communicating with the network layer using the telecommunications network, wherein a service is configured using one or more business rules of the business rule layer, one or more service modules in the service layer, and one or more network implementations in the network layer, wherein the one or more business rules are applied to a service request without being concerned with the service layer or network layer, wherein the one or more service modules perform the service using a result of the one or more business rules being applied without being concerned with how the business rules layer applied the one or more business rules, and wherein the one or more network implementations communicate a result of the service using a protocol without being concerned with how the service layer performed the service.

In yet another embodiment, a method for providing a service delivery platform (SDP) configured to provide services is provided. The method comprises: determining a plurality of functions to be performed; and providing a plurality of layers for the service delivery platform, wherein each layer is configured to perform a function in the plurality of functions; wherein a first function of a first layer is factored out of a second function of a second layer, wherein the second function performs a service in the second layer, wherein the service is designed without being concerned with the first function of the first layer.

In another embodiment, a service delivery platform (SDP) configured to provide services is provided. The platform comprises: a first layer configured concerned with performing a first function; a second layer concerned with performing a second function; and a third layer concerned with performing a third function, wherein the first function of the first layer is factored out of the second function of the second layer, wherein the second function of the second layer is factored out of the third function of the third layer, wherein the second function performs a service in the second layer, wherein the service is designed without being concerned with the first function being performed in the first layer, wherein the third function is performed for the service without being concerned with how the service is performed.

A further understanding of the nature and the advantages of the inventions disclosed herein may be realized by reference of the remaining portions of the specification and the attached drawings.

DETAILED DESCRIPTION OF THE INVENTION

Figure 1:
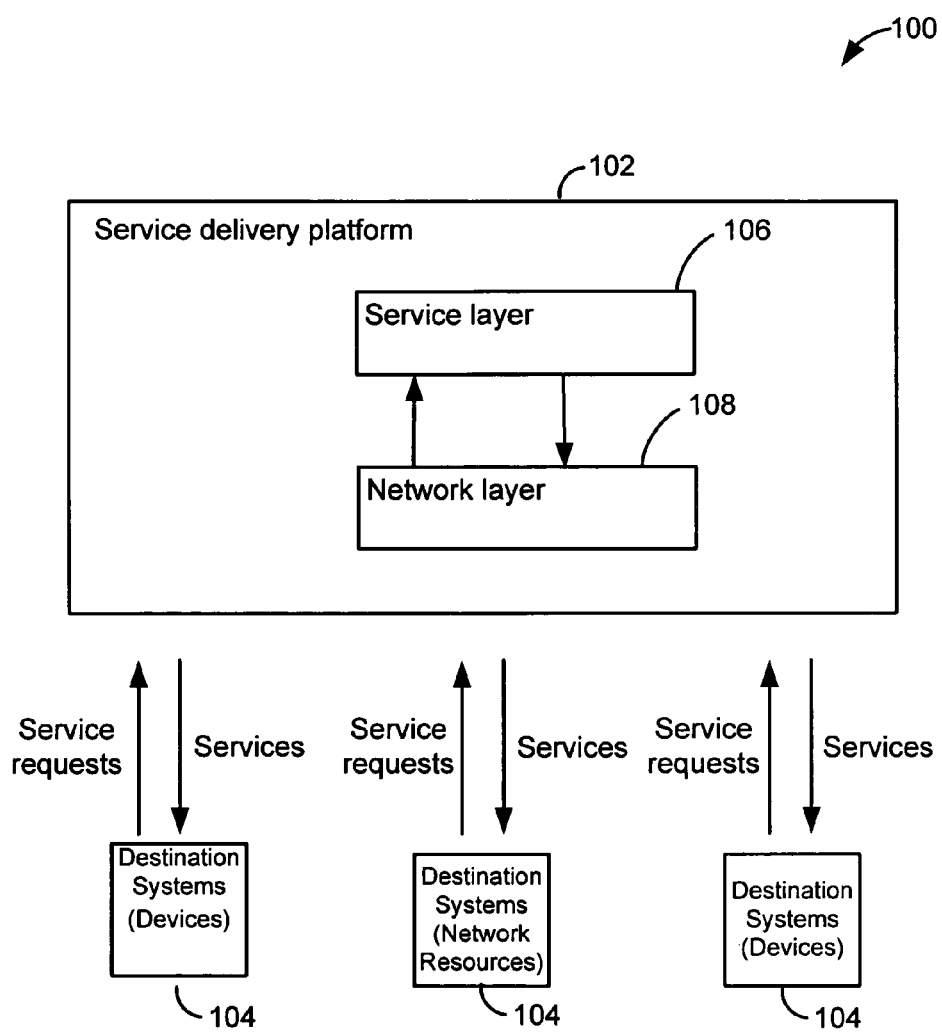
FIG. 1 depicts a system for delivering services according to one embodiment of the present invention.

FIG. 1 depicts a system 100 for delivering services according to one embodiment of the present invention. As shown, a service delivery platform (SDP) 102 and destination systems 104 are provided. Although various layers are described as being part of a service delivery platform (SDP), it will be understood that any number of layers may be provided in the SDP. For example, more or fewer layers may be added to the SDP that is described.

Service delivery platform 102 is configured to provide services. Examples of services include presence services, streaming media, call control services, content management, personalization, intelligent multi-channel messaging, notification, collaboration services, or any other services.

The services are delivered to destination systems 104. Destination systems 104 may be any system or device that can request and receive a service. For example, destination systems 104 may be mobile devices, personal computers, personal digital assistants, blackberry devices, Goodlink devices, workstations, desktop computers, or any other electronic device.

Also, destination systems 104 may be third party providers, applications, enterprises, network resources, etc. The resources that are exposed may be resources for the network layer and also to applications for other layers in SDP 102, or in other domains (third parties). Destination systems 104 may not be just devices. Destination systems 104 may be devices or other applications/systems within a domain or in another domain. A domain may be a domain for a third party.

The services may be exposed to third parties for their own usage. The third party may generate content or applications that can be made available to user on their network (e.g. internet and enterprise intranet) as well as on a public network. For example, a third party's mobile employees of a third party may use the services.

In order to provide the service, different functions may be performed. Each function may be broken up into separate layers that are concerned with certain functions. For example, a first function may perform the service (e.g., determine the location) and a second function may deliver the results of the performed services over many different networks (e.g., over different network protocols, channels and technologies, etc).

Thus, in one embodiment, SDP 102 includes a service layer 106 and a network layer 108. A layer provides a certain function in which that layer is only concerned with performing. A second layer is independent of the other layers and is concerned with performing a second function. Accordingly, the concerns of other layers are factored out of a layer. Although the layers are independent, the layers may use the result of a related layer when performing the functions provided by the current layer. However, the current layer is not concerned with how the result was determined.

Service layer 106 is configured to provide a service. Service layer 106 is only concerned with performing the service. For example, if a location service is being provided, service layer 106 performs the service of determining a location of a device. Service layer 106 is not concerned with functions of other layers, such as any network dependencies. For example, service layer 106 is not concerned with how a determined location will be sent to a destination system 104.

Network layer 108 is concerned with communicating the result of a performed service to a destination system 104. For example, any network dependencies for sending the result of the service are provided by network layer 108. In one embodiment, network layer 108 is configured to send the results of the services using a network protocol and channel to a destination system 104.

Network layer 108 supports service layer 106 and relies on service layer 106 for the result of the service performed, but is not concerned with the functions that are being performed by service layer 106. Conversely, service layer 106 relies on network layer 108 to send a result but is not concerned with the functions that are being performed by network layer 108 to send the result. Accordingly, service layer 106 and network layer 108 are separated by the functions that the layers are concerned with.

In one embodiment, SDP 102 may provide a location service. Service layer 106 is concerned with determining a location for a user. For example, service layer 106 may determine the location for a destination system 104 being used by a user. A request may be sent by service layer 106 to a location server, which can then determine the location. The location is then received by service layer 106. However, service layer 106 is not concerned with how the determined location will be sent to destination system 104 or to a network resource.

Figure 2:
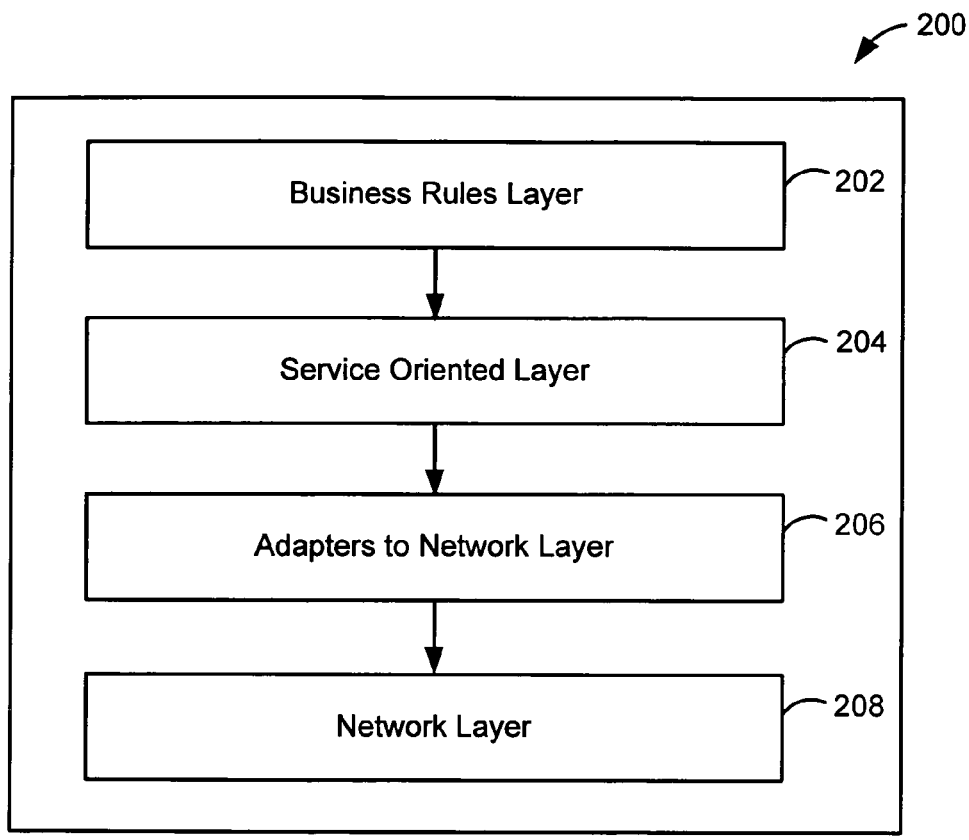
FIG. 2 depicts a service delivery platform according to embodiments of the present invention.

The definition of a layer may be used to further provide additional layers that are concerned with certain functions. FIG. 2 depicts another embodiment of an SDP 102 according to embodiments of the present invention. As shown, SDP 102 includes a business rules layer 202, a service oriented architecture layer 204, adaptors to network layer 206 and a network layer 208.

Business rules layer 202 provides business-related features. For example, business rules are applied to a service request. Business rules may include authenticating a user, applying privacy settings, deciding whether to charge the user and subsequently charging a certain account, deciding who can use the service and under what terms, determining a priority of the user based on agreements signed with him/her (i.e., SLAs—Service Level Agreements), etc. These are concerned with the business aspect of a service. In other words, these business rules are applied and should not affect how the service is performed. In contrast, conventionally, the business rules affect the service because they are not well separated from the service and policies for usage, price, SLAs, etc. are coded within the service. In those conventional approaches, if the business rules change, the service is rewritten, which may be avoided by a layering approach.

For example, with the factoring approach, determining the location is not concerned with whether the user is authorized to use the service or how the user will be charged for using the service. In addition, performing the service is not concerned with management of accounts (users, third parties, etc.), SLAs, other service agreements, such as authentication terms, authorization terms, billing/charging terms, service level terms, logging terms, or any other type of service agreement term. These are imposed by performing policy enforcement on a request to and from the service. Examples of policies and techniques for enforcing the policies are described in U.S. patent application Ser. No. 11/123,468, entitled "Managing Account-Holder Information Using Policies", filed May 5, 2005, and hereby incorporated by reference in its entirety for all purposes. Also, techniques for applying the policy rules by intercepting any exchange that takes place to/from and among resources (applications, components, network resources exposed through it) in SDP 102 are described in U.S. patent application Ser. No. 10/855,999, entitled "Method and Apparatus for Supporting Service Enablers via Service and holding", filed May 28, 2004, and U.S. patent application Ser. No. 10/856,588, entitled "Method and Apparatus for Supporting Service Enablers via Service Composition", filed May 28, 2004, both of which are hereby incorporated by reference in its entirety for all purposes.

Service-oriented layer 204 is concerned with providing and executing a service. For example, service-oriented layer 204 may perform the location service in that it figures out the location of a destination system 104. The location service itself may be implemented by abstracting a location server or a mechanism that uses device information from the device to determine location information.

The service is developed without being concerned with any of the functions performed by other layers. The service may be developed without requiring any information about the business rules (i.e., without worrying about authentication, authorization, account details, charging, etc.). The service is then composed via policies with steps and services that enforce the policies and therefore the business rules. Thus, business rules layer 202 can be realized by applying policy rules. If a request reaches the service oriented layer 204, then the policies have been successfully applied and the service can be performed. The business rules apply on any exchanges to or from elements on the platform.

Network adaptors layer 206 provides adaptors to network layer 208 (and resources in it). For example, adapters are provided for network resources. The adaptors abstract the network to allow access and use of network resources, such as presence server, location server, etc. For example, a request to a location enabler is passed by the enabler via adapter to a location server (network resource), and the result from the location server may be sent back to the network adaptors layer 206. Layer 206 may adapt the location request into a format compatible with a network protocol and channel.

Network layer 208 is configured to expose network resources and communicate with destination systems 104. The network layer includes these resources and their interfaces. For example, interfaces may receive the location results from network resources (servers, gateways or device (in case of GPS) or may send requests to a resource. In one example, network layer 208 may call the resource based on a request from an enabler that is received through an adapter (e.g. ask what is a location). Also, the resource may push information to network layer 208 (e.g. presence update event or info about an incoming call). This information may be sent to an enabler for processing.

The layers provided in SDP 102 may perform their functions independently without concern with the functions being performed by other layers. For example, the layers may be used by different SDP platforms. It does not matter which other layers are found in the platform, the other layers just need to know how to use the result of functions performed by another layer. Thus, layers may be interchanged to create different SDP platforms.

The layers may be related in that one layer may use the result of functions performed by a related layer. For example, a lower layer may provide a result of a function to a layer above it. The higher layer is configured to use the result of the function of the layer below it. This higher layer also provides a result of a function that it performs to a layer above it, and so forth.

The functions performed by a layer may also be related. For example, the functions of a layer may be at the same level of abstraction. For example, network layer is abstracted by the adapters to network layer. The functions of layers are related and thus are placed together as related layers and are coupled together. This layering continues for other functions that need to be performed. It will be recognized that the layers can be arranged in any fashion and a layer can communicate with any number of other layers.

Figure 3:
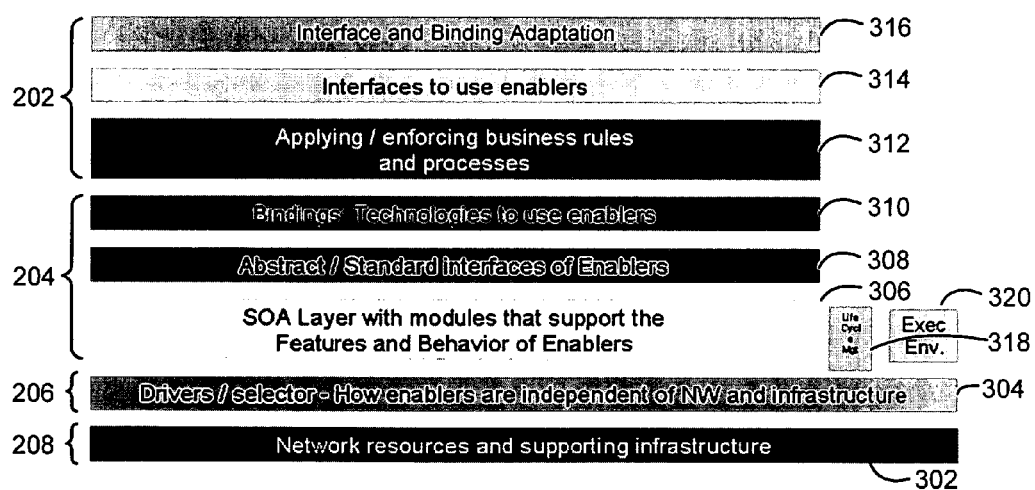
FIG. 3 shows a more detailed embodiment of the service delivery platform according to embodiments of the present invention.

FIG. 3 shows a more detailed embodiment of service delivery platform 200 according to embodiments of the present invention. As shown, a network resources and supporting infrastructure layer 302, a driver/selector layer 304, a service-oriented architecture (SOA) layer 306, an abstract/standard interfaces of enablers layer 308, a bindings layer 310, a business rules layer 312, an interfaces to use enablers layer 314, and an interface and binding adaptation layer 316 are provided. Although various layers are described as being part of SDP 200, it will be understood that any number of layers may be provided in SDP 200. For example, more or fewer layers may be added to the SDP that is described.

These layers may be part of layers 202, 204, 206, and 208 in one embodiment. For example, a layer may be further classified into multiple layers. Each of the multiple layers is still concerned with a function that is performed by that layer overall. For example, service-oriented architecture layer 306, abstract/standard interfaces of enablers layer 308, bindings layer 310 are concerned with separate functions but taken together perform the function that layer 204 is concerned with.

Network resources and supporting infrastructure layer 302 is used to build and support networks for the SDP in a particular environment. For example, depending on the network that may be used to send messages, network resources and supporting infrastructure layer 302 supports the network. Layer 302 renders the SDP independent of underlying network and infrastructure technologies, settings, deployments, and vendors.

Driver/selector layer 304 provides drivers that are used to exchange data with network resources and supporting infrastructure layer 302. For example, the drivers connect modules in SOA layer 306 to network resources and supporting infrastructure layer 302. The network resources as defined here may also include BSS components like charging, billing or rating systems, or subscriber/partner information management.

SOA layer 306 provides a service oriented architecture of service modules that perform services. Enablers are provided that expose the services to abstract interfaces as specified in enabler specifications. The interfaces, functions, and environment to execute, monitor, and manage enabler implementations provide an execution environment that supports monitoring tools, life cycle management tools, etc. Thus, services that are performed are only concerned about performing the service in an execution environment.

The service exposes an abstract interface for monitoring and life cycle management layer 318 through the interface layer 314. When the life cycle management (including steps like development, deployment, monitoring, debugging, upgrade and removal) is factored out by having each component report using libraries that report status, etc., life cycle management does not have to be developed for a service. Rather, it is performed by life cycle management layer 318.

Every layer or service may expose an abstract interface for monitoring and life cycle management through interface layer 308. An execution environment layer 320 can be factored out and provides the mechanism to support life cycle management, execution reliability, scalability, fault tolerance, high availability, carrier grade, etc. support for the services. When the execution environment is factored out, portability is provided because the service may be executed in any execution environment. The service does not have to provide features provided by the execution environment (e.g. support for some functions, protocols etc. . . . like HTTP, caching or high availability, fail over support, load balancing, hot deployment, business activity monitoring, etc. Thus, the layers can be moved to other execution environments. In one embodiment, the realization is J2EE for the execution environment. Enterprise management and JMX may be used to provide life cycle management and monitoring.

A standard or abstract interface layer 308 provides an interface for enablers that factor out any dependency on the execution environment implementation details as well as from the technology choices used by the enablers implementation. Layer 308 defines interfaces for the different enablers and services of SDP 102 in ways that are technology independent (independent of being WS, java, C, C++, C#, Corba, etc.) Examples of such interface representations include UML, WSDL, etc. An abstract interface describes the flows and data exchanges that take place between layer 306 and layer 310 without any assumption of the technology used to implement them in a logical and abstract way.

A bindings layer 310 allows the selection of technologies to access (e.g., the technologies may be accessed from the point of view of who want to use them) or expose (from the point of view of the service provider that exposes them) the enabler implementation. This isolates the enabler implementation and layers below from the technology choices that are used to implement the layers. For example, technology choices may be to use Java, web services, or other technologies to implement the enablers. Depending on the technology selected, different bindings are provided in bindings layer 310.

Business rules layer 312 is responsible for applying and enforcing business rules and processes. For example, how a service can be used by whom, for what, and in what conditions. The business layer applies policies/rules on any data exchange to and from a service layer enabler (or underlying resources protected by it). This is described in U.S. patent application Ser. No. 10/855,999, entitled "Method and Apparatus for Supporting Service Enablers via Service and holding", filed May 28, 2004, and U.S. patent application Ser. No. 10/856,588, entitled "Method and Apparatus for Supporting Service Enablers via Service Composition", filed May 28, 2004, both of which are hereby incorporated by reference in its entirety for all purposes. At the level of the business layer rules, policies are applied based on who requests what. The management of the involved parties (account of users, 3 parties) is done at that level by linking policies to relationships. For example, for a given account signed up for a given SLA, policies are used to make sure services are authorized, charged at that rate and received at the quality of service. Examples of policies and techniques for enforcing the policies are described in U.S. patent application Ser. No. 11/123,468, entitled "Managing Account-Holder Information Using Policies", filed May 5, 2005, and hereby incorporated by reference in its entirety for all purposes.

Interfaces to use enablers layer 314 provides interfaces that are exposed for usage of the enabler by applications or other enablers. The interfaces may be modified as a result of the applied policies in the business rule layer as described in U.S. patent application Ser. No. 11/070,317, filed May 1, 2005, entitled "Policy Interface Description Framework. In general the transformation may be as arbitrary as desired and specified by the policies. The interface exposed by layer 202 may be a transformation T of the interface 310, that is, new interface=T(interface of layer 310). T can include: impact of policies and orchestration: layer 312 that produce layer 314 and additional changes of bindings or interface transformation brought in by layer 316.

Interface and binding adaptation layer 316 allows the use of the business rules to perform things such as service composition, choreography/orchestration (as specified by the policies) and transformation of interface from one interface to another (e.g. from interface B to C=T(B) as specified by the policies, where T is any function resulting from what the policy specifies to do). For example, changing the interface from one binding (HTTP) to another (e.g. Corba) may be provided by layer 316. This performs interface changes. Applications, third party can still interact in such framework using the teachings of invention U.S. patent application Ser. No. 11/070,317, filed May 1, 2005, entitled "Policy Interface Description Framework, which is hereby incorporated by reference in its entirety.

The layering described provides many advantages. For example, because of factorization, the SDP is independent of vendor choices and it is network technology neutral. The SDP is also distributable. For example, because of the service layer, different services may be built in a network independent manner. When different services are offered on different networks, the service layer may be taken and used with the different networks.

Enablers may be realized with multiple different technologies (e.g., IMS vs. parlay vs. IN (intelligent networking) or in some cases PSTN). Enablers and the layer above are stabilized with respect to changes and migration of technology product choices for underlying products. For example, even though service results may be sent through a different product or network, the service as it is performed may remain the same. Also, enablers may be built using various technologies as provided by the binding layer.

Also, business rule enforcement may be provided because an enabler can focus on extrinsic functionality, a service provider can set up their own policies, a business can use the enablers and implement their own policies, the enablers can be reused for different businesses, and delegation of functions to other enablers is formalized (as a service composition).

Another advantage of the decomposition is that components in layer 306 can isolate components in the layers above not only in terms of the dependencies on network resources, vendors, etc. through adapters 304 and functions provided by enablers in layer 306; but by doing so, it is possible to have aspects that require low latencies as network resources (e.g. Parlay call control or SIP servlets or other switches) are able to react quickly under heavy loads and applications in upper layers (above layer 306) are able to support interaction with the resources without necessarily needing to have the latency performances. For examples enablers that implement higher level call control functions like establishing monitoring changing or tearing off a call (call control and third party call control) expose low constraint interfaces while they are implemented with resources that have low latency performances (e.g., switches, Parlay, SIP servlets etc.). Thus, the layering allows the performance requirements from layer to layer to be isolated.

Figure 4:
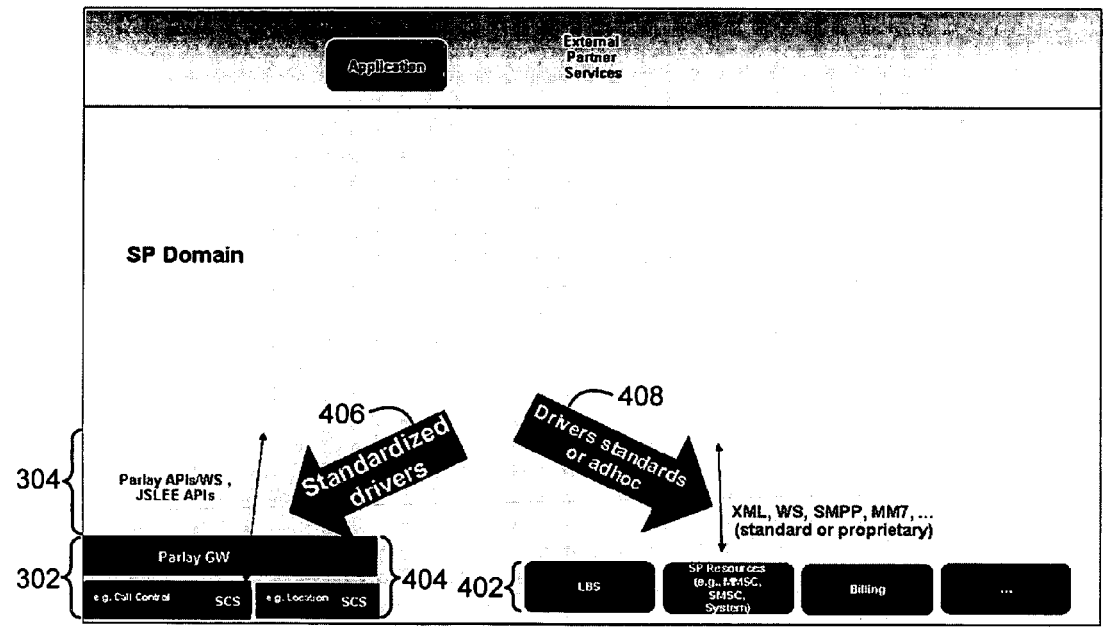
FIG. 4 shows a more detailed embodiment of a network resources and supporting infrastructure layer and a driver/selector layer according to embodiments of the present invention.

FIGS. 4-7 show a more detailed embodiment of SDP 200 depicted in FIGS. 2 and 3. FIG. 4 shows a more detailed embodiment of network resources and supporting infrastructure layer 302 and driver/selector layer 304 according to embodiments of the present invention. Network resources and supporting infrastructure layer 302 exposes the resources for a network.

Modules 402 are provided for individual/proprietary services. For example, the services supported may be location-based services (LBS), service provider resources (e.g. MMS, SMS, system), billing services applications, and any other services. These individual services may require specific network resources that may be proprietary.

Parlay gateway 404 may be a standard gateway used to expose standardized resources. Parlay gateway 404 provides standard components that expose network resources. For example, network resources may be exposed through a single point of parlay gateway 404. In one embodiment, call control and location services that are standardized are exposed using parlay gateway 404.

Thus, network resources may be exposed using individual/proprietary applications or through a standard parlay gateway.

Standardized drivers 406 provide standard drivers that connect services to parlay gateway 404. In order to communicate with resources in the network, drivers are needed to send messages. Parlay gateway 404 may have an application programming interface (API) that is used to send messages to parlay gateway 404. For example, when sending an SMS, the SMS message may be sent to an SMSC in a network. A standardized driver 406 may be provided through parlay gateway 404 to send the SMS message.

Modules 402 may also have drivers 408. Drivers 408 may be standard drivers for the modules or also ad hoc drivers that are modified from standard drivers. For example, if a MMS message or email message is sent, then a MMS (MM7) driver for an MMS message or an SMPP driver for an email may be used. The driver is selected based on what is being sent. For example, if a message is to go to an SMSC or MMSC, different drivers may be selected above.

Figure 5:
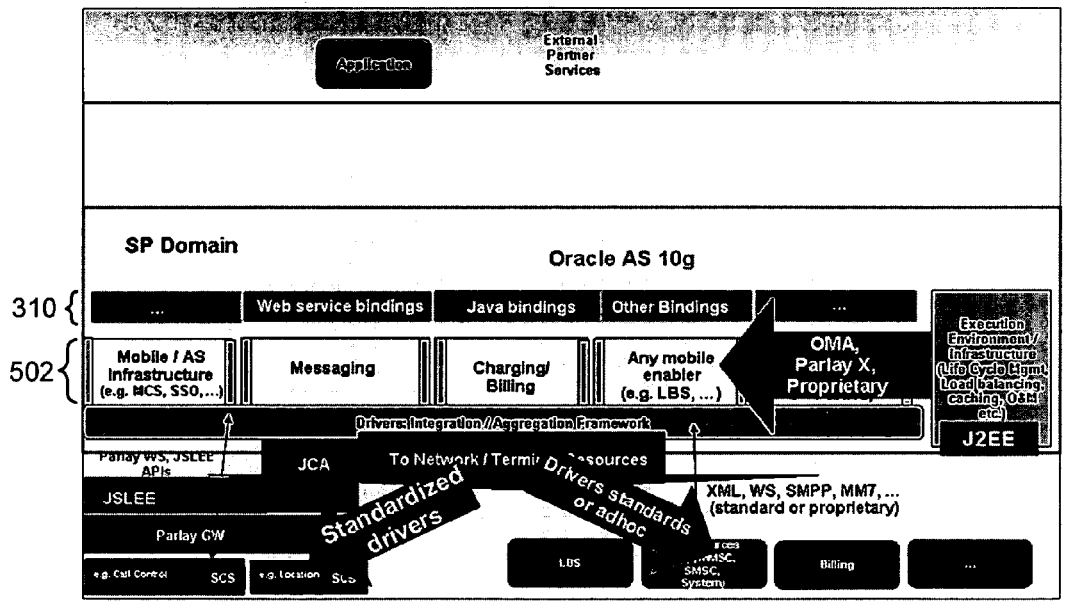
FIG. 5 shows a more detailed embodiment of the service layer according to embodiments of the present invention.

FIG. 5 shows a more detailed embodiment of SOA layer 306 according to embodiments of the present invention. Service modules 502 provide various functions that provide services. Services that may be provided include mobile infrastructure services, messaging services, charging/billing services, any mobile enabler services (location-based services), AAA services (user/third party services), life cycle management services, load balancing services, caching services, operations and management services, etc.

The messaging service may provide multi-channel communication, intelligent messaging, notification of events, two-way messaging, etc. Also, the messaging module may provide real time services, such as third-party call control, conferencing, bridging, streaming, etc.

Service modules 502 are abstracted such that they can perform services without relying on other layers. The services are performed and then adapters to network layer 304 are selected to send the result of the services. For example, if the result of the services is to be sent in an SMS, an SMS driver is used to send the SMS message to an SMSC module 402.

The bindings layer 310 includes various bindings, such as web service bindings, java bindings, and any other bindings. Different technologies may be used to write applications found in modules 502. For example, java may be used, web services may be used, etc. Depending on the technology used, various bindings may be selected and used.

In one embodiment, SOA layer 306 provides a J2EE environment to realize the service oriented architecture. This may be provided in an application server or other platform.

Figure 6:
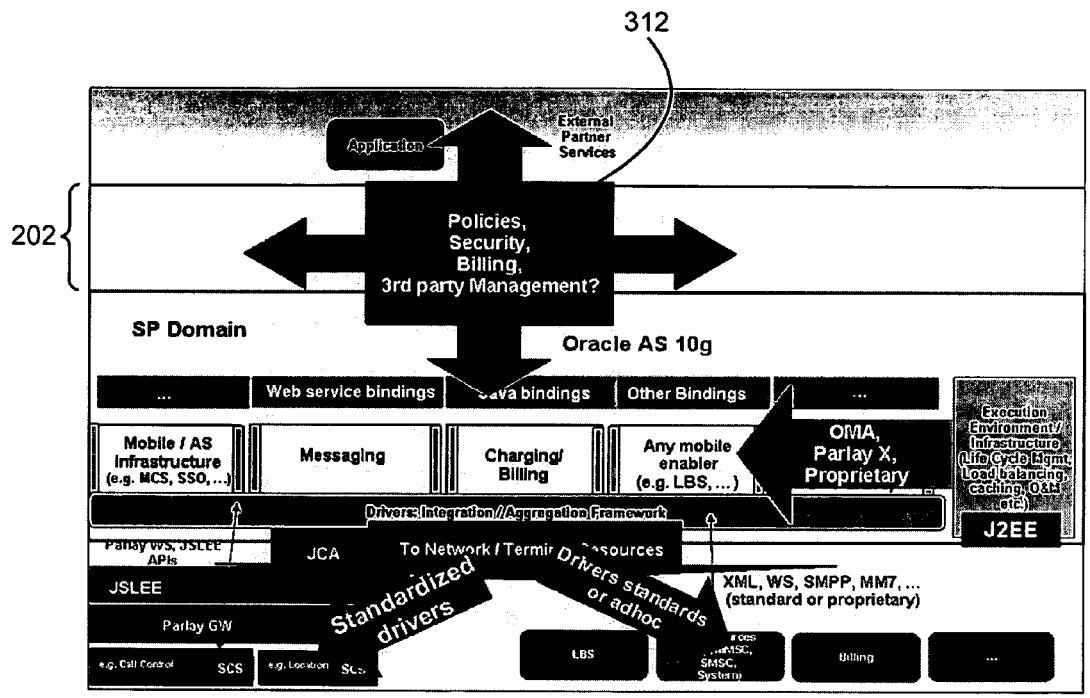
FIG. 6 shows a more detailed embodiment of the business rules layer according to embodiments of the present invention.

FIG. 6 shows a more detailed embodiment of layer 202 according to embodiments of the present invention. As shown, policies 312 are provided that expose how modules in service-oriented layer 204 can be used. For example, policies for usage are provided. These policies are applied to determine who can use the services provided.

Policies can be written by third party management tools, such as by customer relationship management (CRM) applications or a self service portal (see U.S. patent application Ser. No. 11/123,468, entitled "Managing Account-Holder Information Using Policies", filed May 5, 2005). These policies determine which parties can use the rules. The policies used may be provided for security, billing, etc. For example, a security policy for who can use the services may be provided. Examples of policy interfaces are described in U.S. patent application Ser. No. 10/855,999, entitled "Method and Apparatus for Supporting Service Enablers via Service and holding", filed May 28, 2004, and U.S. patent application Ser. No. 10/856,588, entitled "Method and Apparatus for Supporting Service Enablers via Service Composition", filed May 28, 2004, both of which are hereby incorporated by reference in its entirety for all purposes. Also, how a person is billed for using the services may also be provided in a policy. Examples of billing via policies are provided in U.S. patent application Ser. No. 11/123,471, filed May 5, 2005, entitled "Charging Via Policy Enforcement", which is hereby incorporated by reference in its entirety.

Figure 7:
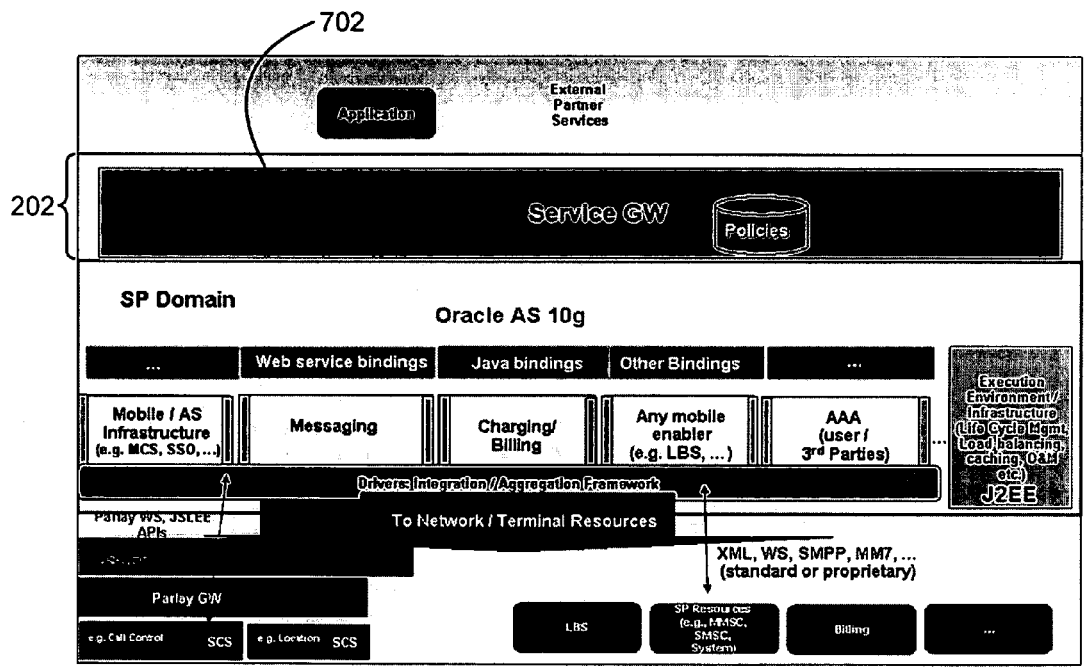
FIG. 7 depicts another embodiment of the business rules layer according to embodiments of the present invention.

FIG. 7 depicts another embodiment of layer 202 according to embodiments of the present invention. A service gateway 702 is provided that provides a framework that exposes services that are secure, manageable, and billable. The services are exposed based on policies provided. Examples of policies are described in U.S. patent application Ser. No. 10/855,999, entitled "Method and Apparatus for Supporting Service Enablers via Service and holding", filed May 28, 2004, and U.S. patent application Ser. No. 10/856,588, entitled "Method and Apparatus for Supporting Service Enablers via Service Composition", filed May 28, 2004, both of which are hereby incorporated by reference in its entirety for all purposes.

Figure 8:
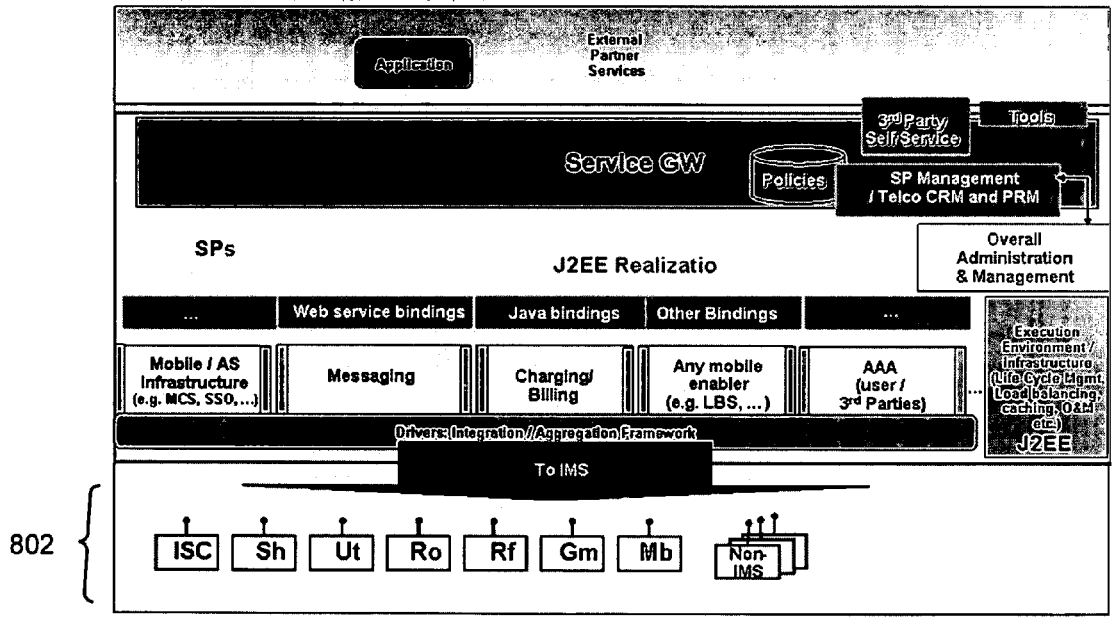
FIG. 8 depicts an embodiment of a service delivery platform that is used in conjunction with an IP multimedia system (IMS) according to one embodiment of the present invention.

FIG. 8 depicts an embodiment of a service delivery platform that is used in conjunction with an IP multimedia system (IMS) according to one embodiment of the present invention. IMS 802 is used as a particular implementation of network layer 208. Because of the portability (i.e. network and technology independence) of SDP 200 achieved by the factorization provided by embodiments of the present invention, IMS layer 802 may be added to the service delivery platform without having to change the components and services built on the platform or built by third party using the service/components expose by the platform. The only thing that may change is the drivers used to send messages to IMS layer 802. For example, it may be decided that IMS 802 may be used instead of a parlay gateway 402. Because of the modularity of layers in a service delivery platform, a new IMS layer 802 may be added. Service-oriented layer 204 and business rules layer 202 may not be changed even if IMS layer 802 is added. It may be that just the drivers in layer 304 needed to be changed in order to send messages to IMS layer 802.

Figure 9:
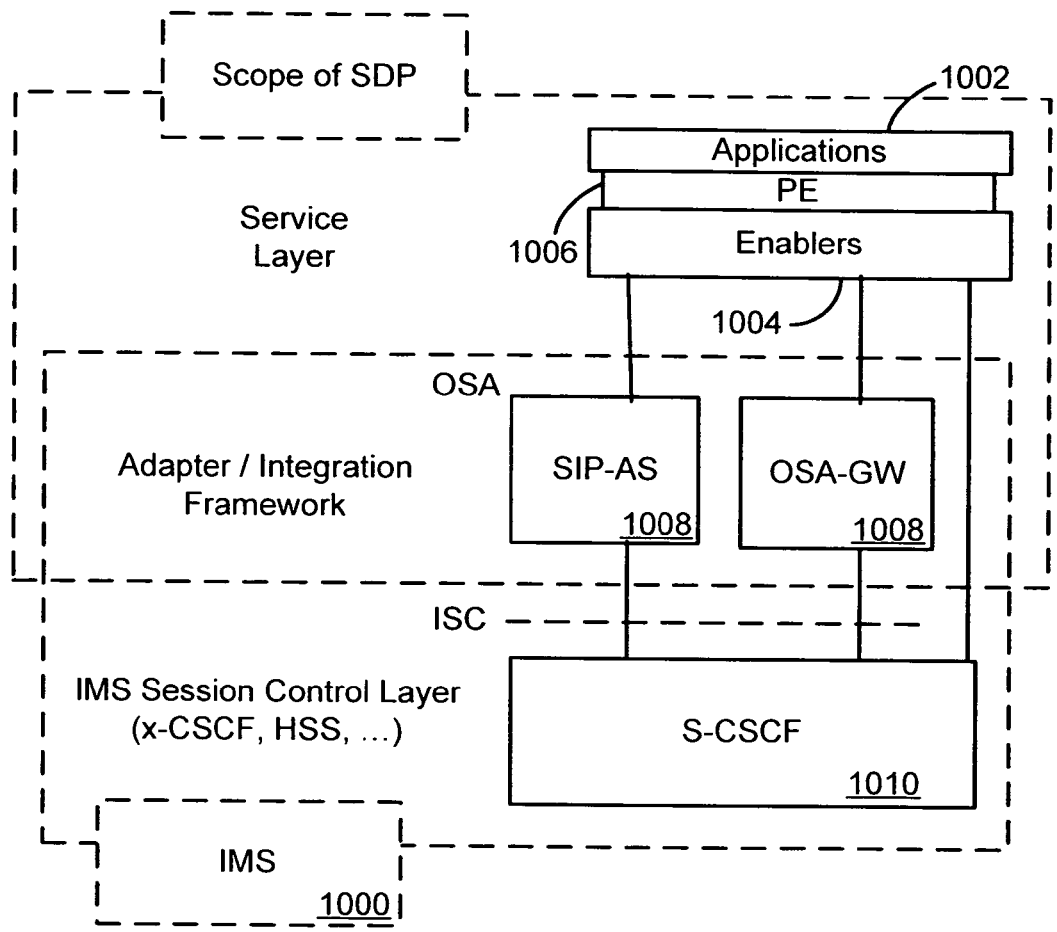
FIG. 9 depicts another embodiment of a service delivery platform showing how services are deployed on an IP multimedia system (IMS) according to one embodiment of the present invention.

FIG. 9 depicts another embodiment of a service delivery platform showing how services are deployed on an IP multimedia system (IMS) 1000 according to one embodiment of the present invention. Applications 1002 are built to the interfaces of enablers 1004. The enablers abstract and expose the underlying IMS capabilities (e.g presence, call/media control, etc.). A policy enforcement (PE) layer 1006 controls how the interfaces of enablers are exposed to the applications (and how business rules are applied—as enforced by policies on all exchanges). The enablers are implemented via drivers 1008. On the IMS, the drivers may be parlay/OSE APIs, SIP applications and/or the interfaces exposed by the IMS. Each of the above may be implemented in a separate layer.

In addition, a serving call session control function (S-CSCF) 1010 may be implemented. The S-CSCF performs session control and provides registration services. It maintains state and interacts with the SDP as needed by a network operator for support of services. The low latencies requirements at the S-CSCF control level with progressively less low latencies constraints at the level of the implementation of the enabler, interface of the enablers, policy enforcement/application of business rules and at the level of the applications that use the enablers can be satisfied using the SDP.

In conclusion, building a service delivery platform (SDP) involves significant investment in telecom infrastructure. For example, technology specific network elements need to be incorporated. Vertical/silo solutions and services provide limited reuse of resources and are hard to upgrade, administer, and modify. It is also costly and time-consuming to deploy new services.

Embodiments of the present invention provide abstraction of underlying network technology choices and settings (vendors, protocols, Parlay or no Parlay, etc.). Further, stabilization of application/service development APIs, integration framework with existing and future network resources, and support of migration or piecemeal integration at the network level is provided. The support of relevant bindings for applications/services development APIs may be in-house (Java, C, . . . ) or 3rd party (WS).

The SDP may be integrated in the operator's business process/chain and support dynamic, policy driven, business processes at the application level. Development, deployment and monitoring/management environment for applications/services built on service provider assets is provided by the SDP. A framework to facilitate reuse by delegation, composition and orchestration is provided.

The SDP exposes applications/services and service provider assets in ways that are: secure, manageable (centrally and distributed), billable, and based on service provider's own policies. Tools and applications are provided for management of: 3rd parties (Enterprises, service providers/content providers), subscribers, and services. Self-service tools are provided for 3rd party (Enterprise, Content providers), subscribers, and service administration.

The SDP also provides support for value-added services (technology independent, plug-and-play provider integration) through streaming media, call control, content management, personalization, intelligent multi-channel messaging/notification/asynchronous ASK, and collaboration.

Figure 10:
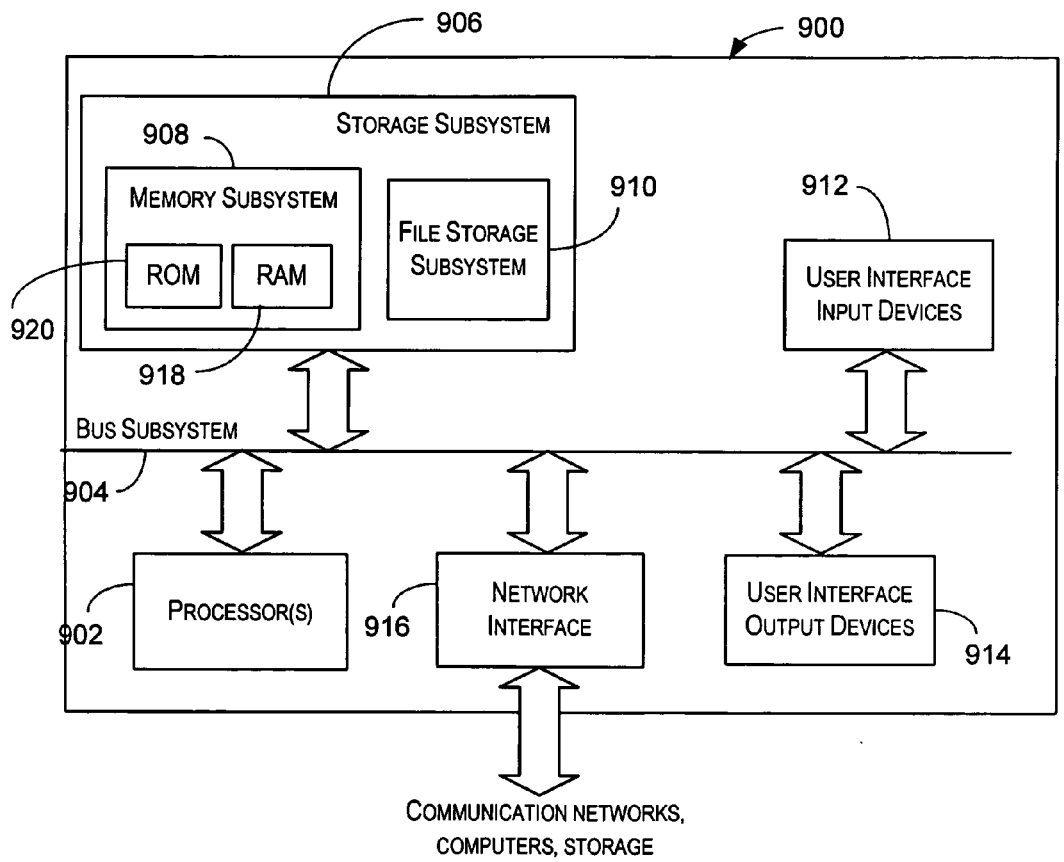
FIG. 10 is a simplified block diagram of a data processing system that may be used to perform processing according to an embodiment of the present invention.

FIG. 10 is a simplified block diagram of data processing system 900 that may be used to perform processing according to an embodiment of the present invention. As shown in FIG. 10, data processing system 900 includes at least one processor 902, which communicates with a number of peripheral devices via a bus subsystem 904. These peripheral devices may include a storage subsystem 906, comprising a memory subsystem 908 and a file storage subsystem 910, user interface input devices 912, user interface output devices 914, and a network interface subsystem 916. The input and output devices allow user interaction with data processing system 902.

Network interface subsystem 916 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 916 serves as an interface for receiving data from other sources and for transmitting data to other sources from data processing system 900. Embodiments of network interface subsystem 916 include an Ethernet card, a modem (telephone, satellite, cable, ISDN, etc.), (asynchronous) digital subscriber line (DSL) units, and the like.

User interface input devices 912 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 900.

User interface output devices 914 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 900.

Storage subsystem 906 may be configured to store the basic programming and data constructs that provide the functionality of the present invention. For example, according to an embodiment of the present invention, software modules implementing the functionality of the present invention may be stored in storage subsystem 906. These software modules may be executed by processor(s) 902. Storage subsystem 906 may also provide a repository for storing data used in accordance with the present invention. Storage subsystem 906 may comprise memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions are stored. File storage subsystem 910 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 904 provides a mechanism for letting the various components and subsystems of data processing system 902 communicate with each other as intended. Although bus subsystem 904 is shown schematically as a single bus, alternative embodiments of the bus subsystem may utilize multiple busses.

Data processing system 900 can be of varying types including a personal computer, a portable computer, a workstation, a network computer, a mainframe, a kiosk, or any other data processing system. Due to the ever-changing nature of computers and networks, the description of data processing system 900 depicted in FIG. 10 is intended only as a specific example for purposes of illustrating the preferred embodiment of the computer system. Many other configurations having more or fewer components than the system depicted in FIG. 10 are possible.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A service delivery platform (SDP) comprising:
a processor; and
a memory coupled with and readable by the processor and having stored therein a sequence of instructions which, when executed by the processor, cause the processor to execute:
a network layer within the SDP, the network layer comprising a plurality of network resources and performing a first set of functions concerned with communicating with the plurality of network resources, and wherein the network layer performs the first set of functions independently and without concern about functions of other layers of the SDP;
a network adapter layer within the SDP comprising a plurality of adapters for the plurality of network resources, the adapters providing an abstraction of the network resources, and wherein the network adapter layer performs functions independently and without concern about functions of other layers of the SDP;
a service layer within the SDP performing a second set of functions concerned with a service, the service layer comprising one or more enablers and an abstract interface layer, wherein the enablers expose the second set of functions to the abstract interface layer and the abstract interface layer provides interfaces for the one or more enablers, wherein the service layer performs the second set of functions independently and without concern about functions of other layers of the SDP, wherein the first set of functions of the network layer is factored out of the second set of functions of the service layer, and wherein the second set of functions performs a service in the service layer using the first set of functions of the network layer through the abstract interface layer, enablers, and network adapter layer;
a lifecycle management layer within the service layer and providing through the abstract interface layer a set of lifecycle management functions factored out from the second set of functions of the service layer and the first set of functions of the network layer, wherein the lifecycle management layer performs the lifecycle management functions independently and without concern about functions of other layers of the SDP and wherein the lifecycle management functions include one or more of development functions, deployment functions, monitoring functions, debugging functions, upgrade functions, or removal functions for one or more services of the service layer or one or more of the network resources; and
a business rules layer within the SDP separate from the service layer performing a third set of functions concerned with applying business rules to a service request from a user, wherein the business rules layer performs the third set of functions independently and without concern about functions of other layers of the SDP, wherein the second set of functions and lifecycle management functions of the service layer are factored out of the third set of functions of the business rules layer, and wherein enforcing the business rules on the second set of functions and lifecycle management functions includes composing the second set of functions and lifecycle management functions of the service layer through the abstract interface layer to provide the service based on the rules applied to the service request by the business rules layer.

2. The SDP of claim 1, wherein the policies are exposed to third parties.

3. The SDP of claim 1, wherein the service layer is configured to perform a plurality of services and the network layer is configured to communicate through a plurality of communication methods wherein the service layer is configured to determine a service in the plurality of services, wherein the network layer is configured to determine a communication method in the plurality of communication methods, wherein services in the plurality of services can be performed using the network resources through the network adapter layer without being concerned with which communication method in the plurality of communication methods is determined, and wherein the business rules layer is configured to perform one or more of composition of the plurality of service, orchestration of the plurality of services or delegation to one or more of the plurality of service.

4. The SDP of claim 1, wherein the service layer further comprises an interface and bindings layer configured to apply the one or more policies for the service and perform service composition and orchestration and transformation of interfaces of the abstract interface layer as specified by the policies.

5. The SDP of claim 4, wherein the business rules layer comprises a business rules enforcement layer configured to enforce business rules based on the service requested and the user making the request without being concerned with the interface and bindings layer and the one or more enablers, the business rules comprising rules for authorizing the request, charging for the service, and enforcing a quality of service.

6. The SDP of claim 1, wherein the service layer comprises a bindings layer configured to isolate the business rules layer from different technologies used by different enabler instances of the one or more enablers.

7. The SDP of claim 6, wherein the service layer comprises an interface to the enabler instances for the different technologies.

8. The SDP of claim 7, wherein the service layer comprises a service oriented layer comprising service modules, each service module configured to perform a service without being concerned with the enablers and bindings being used for the service.

9. The SDP of claim 1, wherein the network adapter layer comprises drivers for different networks.

10. The SDP of claim 9, wherein the network layer comprises a network resource layer comprising network infrastructure configured to communication with different networks without being concerned with the drivers used.

11. The SDP of claim 8, wherein the service layer comprises an execution environment layer.

12. The SDP of claim 11, wherein the execution environment layer comprises a J2EE environment.

13. A method for providing services by a service delivery platform (SDP), the method comprising:

executing, by a server of the SDP, a network layer comprising a plurality of network resources and performing a first set of functions concerned with communicating with the plurality of network resources, and wherein the network layer performs the first set of functions independently and without concern about functions of other layers of the SDP;

executing, by the server of the SDP, a network adapter comprising a plurality of adapters for the plurality of network resources, the adapters providing an abstraction of the network resources, and wherein the network adapter layer performs functions independently and without concern about functions of other layers of the SDP;

executing, by the server of the SDP, a service layer performing a second set of functions concerned with a service, the service layer comprising one or more enablers and an abstract interface layer, wherein the enablers expose the second set of functions to the abstract interface layer and the abstract interface layer provides interfaces for the one or more enablers, wherein the service layer performs the second set of functions independently and without concern about functions of other layers of the SDP, wherein the first set of functions of the network layer is factored out of the second set of functions of the service layer, and wherein the second set of functions performs a service in the service layer using the first set of functions of the network layer through the abstract interface layer, enablers, and network adapter layer;

executing, by the server of the SDP, a lifecycle management layer within the service layer and providing through the abstract interface layer a set of lifecycle management functions factored out from the second set of functions of the service layer and the first set of functions of the network layer, wherein the lifecycle management layer performs the lifecycle management functions independently and without concern about functions of other layers of the SDP and wherein the lifecycle management functions include one or more of development functions, deployment functions, monitoring functions, debugging functions, upgrade functions, or removal functions for one or more services of the service layer or one or more of the network resources; and executing, by the server of the SDP, a business rules layer within the SDP separate from the service layer performing a third set of functions concerned with applying business rules to a service request from a user, wherein the business rules layer performs the third set of functions independently and without concern about functions of other layers of the SDP, wherein the second set of functions and lifecycle management functions of the service layer are factored out of the third set of functions of the business rules layer, and wherein enforcing the business rules on the second set of functions and lifecycle management functions includes composing the second set of functions and lifecycle management functions of the service layer through the abstract interface layer to provide the service based on the rules applied to the service request by the business rules layer.

14. A computer-readable memory comprising a set of instructions stored therein which, when executed by a processor, causes the processor to provide services by a service delivery platform (SDP) by:

executing a network layer within the SDP, the network layer comprising a plurality of network resources and performing a first set of functions concerned with communicating with the plurality of network resources, and wherein the network layer performs the first set of functions independently and without concern about functions of other layers of the SDP;

executing a network adapter layer within the SDP comprising a plurality of adapters for the plurality of network resources, the adapters providing an abstraction of the network resources, and wherein the network adapter layer performs functions independently and without concern about functions of other layers of the SDP;

executing a service layer within the SDP performing a second set of functions concerned with a service, the service layer comprising one or more enablers and an abstract interface layer, wherein the enablers expose the second set of functions to the abstract interface layer and the abstract interface layer provides interfaces for the one or more enablers, wherein the service layer performs the second set of functions independently and without concern about functions of other layers of the SDP, wherein the first set of functions of the network layer is factored out of the second set of functions of the service layer, and wherein the second set of functions performs a service in the service layer using the first set of functions of the network layer through the abstract interface layer, enablers, and network adapter layer;

executing a lifecycle management layer within the service layer and providing through the abstract interface layer a set of lifecycle management functions factored out from the second set of functions of the service layer and the first set of functions of the network layer, wherein the lifecycle management layer performs the lifecycle management functions independently and without concern about functions of other layers of the SDP and wherein the lifecycle management functions include one or more of development functions, deployment functions, monitoring functions, debugging functions, upgrade functions, or removal functions for one or more services of the service layer or one or more of the network resources; and executing a business rules layer within the SDP separate from the service layer performing a third set of functions concerned with applying business rules to a service request from a user, wherein the business rules layer performs the third set of functions independently and without concern about functions of other layers of the SDP, wherein the second set of functions and lifecycle management functions of the service layer are factored out of the third set of functions of the business rules layer, and wherein enforcing the business rules on the second set of functions and lifecycle management functions includes composing the second set of functions and lifecycle management functions of the service layer through the abstract interface layer to provide the service based on the rules applied to the service request by the business rules layer.

\* \* \* \* \*